United States Patent

[11] 3,608,947

| [72] | Inventors | Charles S. Mundy<br>Boulevard;<br>Fred Noel Spiess, La Jolla, both of Calif. |
|---|---|---|
| [21] | Appl. No. | 48,244 |
| [22] | Filed | June 22, 1970 |
| [45] | Patented | Sept. 28, 1971 |
| [73] | Assignee | The United States of America as represented by the Secretary of the Navy |

[54] APPARATUS FOR RETRIEVING OCEANOGRAPHIC CABLE FROM THE SEA BOTTOM
7 Claims, 2 Drawing Figs.

[52] U.S. Cl. ............................................. 294/66, 294/99
[51] Int. Cl. ............................................... B63c 7/06
[50] Field of Search ........................................... 294/66; 61/72.3, 72.4

[56] References Cited
UNITED STATES PATENTS
3,097,874 7/1963 Brockbank ................... 294/66
3,129,030 4/1964 Brockbank et al ............ 294/66

FOREIGN PATENTS
195,191 3/1923 Great Britain ................ 294/66

*Primary Examiner*—Evon C. Blunk
*Assistant Examiner*—Johnny D. Cherry
*Attorneys*—Richard S. Sciascia and Paul N. Critchlow ABSTRACT: Lost oceanographic instruments can be recovered by locating and retrieving the line to which they are attached. A cable grabber formed of a four-layered sandwich presently is employed, the sandwich including upper and lower plowheads and upper and lower spring-loaded pressure plates, the plates being attached by upper and lower mounting braces to a tow sled which itself can be towed in any manner. The entire apparatus is symmetrically formed to permit an upside down operation. The pressure plates are resiliently maintained in a spaced disposition, while the plowheads include plowshares to dig into the bottom sediment and guide a trapped cable section into the space between the plates. The sled itself is free-flooding to improve stability. The resistance of a trapped cable to the pull of the sled causes the pressure plates to wedge together and clamp about the cable. Breakage of the cable is avoided by minimizing bending and by using a spring arrangement that exerts a controlled clamping force.

APPARATUS FOR RETRIEVING OCEANOGRAPHIC CABLE FROM THE SEA BOTTOM

The invention described herein may be manufactured and used by or for the Government of the United States of America for governmental purposes without the payment of any royalties thereon or therefor.

BACKGROUND OF THE INVENTION

The present invention relates to the retrieval of lost oceanographic instruments and, in particular, to cable grabbers for locating and retrieving instrument cable lying on the ocean floor.

Substantial difficulties have been experienced in recovering lost oceanographic instruments particularly in relatively deep water in which diver operations as well as detection become difficult. Most of these instruments, of course, are deployed from a line or cable so that one of the more commonly employed recovery techniques is to hook and retrieve the cable. However, cables frequently are seriously deteriorated due to long exposure and, even though they may be located and engaged, the cable breaks as the instrument is being retrieved. Such breakage is aggravated by the use of hooks or some other grabbing instruments which produce a sharp bend in the cable. Further, conventional cable grabbers have little control over the clamping force applied to the trapped or hooked section of the cable so that this force alone may be sufficient to produce breakage. Another difficulty is the inability to physically contact a cable that is imbedded in the sediment or alluvial fan of the ocean floor.

THE OBJECTS OF THE INVENTION

It is therefore an object of the present invention to provide cable-retrieving apparatus capable of being towed along a sea floor to locate, clamp and retrieve the cable of lost oceanographic instruments or the like.

Another object is to provide apparatus capable of minimizing cable breakage by minimizing the bending of the trapped cable and also by controlling the clamping pressure exerted on the trapped cable so that no more pressure is applied than that which is necessary to achieve recovery.

Yet another object is provide apparatus capable of plowing into the ocean floor sediment to locate the cable and also capable of operating in any disposition which may result during its deployment.

Still another object is to provide a plowlike cable grabber that is unusually stable during its operation.

Another object is to provide apparatus capable of operating on a sandy bottom in which it may at least be partially embedded in the floor sediment.

Other objects are to provide a relatively simple, easily deployed, inexpensive and effective cable-retrieving apparatus.

These and other objects are achieved by utilizing a symmetrical sled to tow a cable grabber, the grabber including upper and lower platelike clamping members as well as means for resiliently maintaining these upper and lower clamping members in a predetermined vertically spaced operative disposition. Each of the clamping members has an outer surface carrying a symmetrical plowlike flanges for plowing into the surface of the ocean floor to locate embedded cable, means also being provided for guiding contacted cable into the space between the clamping members. Most suitably, cable-restraining means project into or bisect the space between the clamping members so as to engage a trapped cable section and form it into a relatively wide are that minimizes bending and possible breakage. The cable grabber as a whole is secured to the sled by mounting braces carried by the sled and these braces preferably include upper and lower brace members each secured to a clamping member in such a manner that the resistance of the trapped cable to the forward pull of the sled causes the clamping members to wedgedly contract for securely engaging the trapped cable section. Most suitably, two sets of upper and lower mounting braces are used, the sets being laterally spaced and engaging the clamping members in a balanced manner to assure equal distribution of the towing force.

Another feature which will be described in greater detail involves a special spring arrangement permitting the wedging force of the clamping plates to produce a pressure that increases proportionally with the cable's resistance to movement. Also, as will be described, the preferred embodiment includes special guiding members as well as special alignment members which also act to restrain the trapped section of the cable and form it into the desired arc.

Brief description of the drawings

A preferred embodiment of the invention as illustrated in the accompanying drawings of which

DETAILED DESCRIPTION OF THE INVENTION

Figure 1:
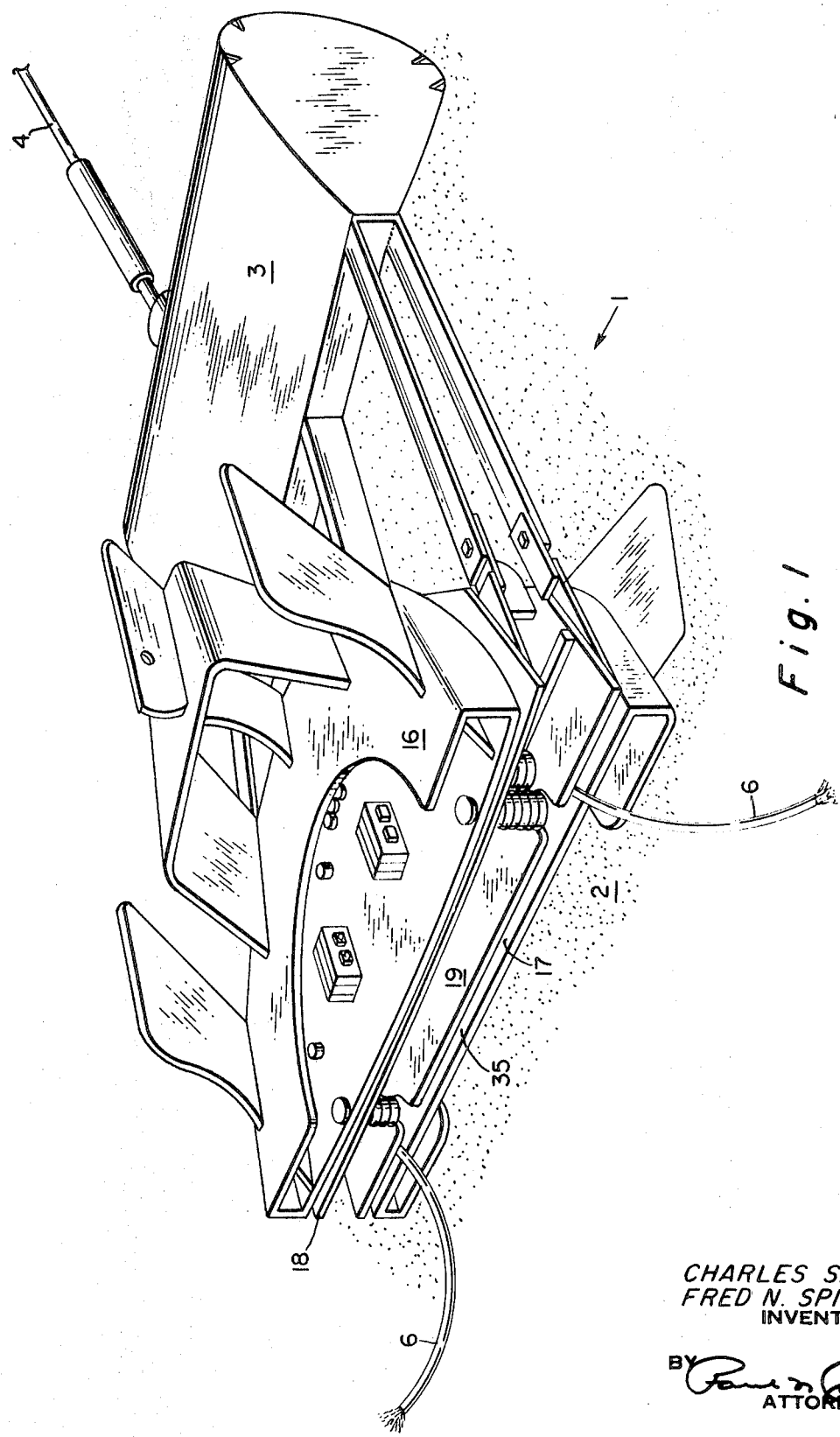
FIG. 1 is a perspective view illustrating the apparatus deployed in an operative manner on the sea floor.

FIG. 1 shows a cable grabber 1 which is a generic term applicable to the entire cable locating and clamping portion of the apparatus. In use, the grabber is towed along an ocean bottom 2 by a sled 3 secured to a towline 4 which may lead to a surface vessel or such other towing means as may be used for moving the apparatus along the sea floor. Cable 6 represents a section of the cable normally used to deploy an oceanographic instrument and, for present purposes, it is assumed that the instrument to be recovered is coupled to the cable. When the operation is being conducted on a sandy sea floor, cable 6 normally would be embedded in the sediment 2 rather than lying on the surface of this floor as shown in FIG. 1. Obviously, the retrieval is accomplished by towing the sled and grabber along the bottom until a section of the cable is engaged by the grabber to permit recovery of the oceanographic instrument aboard the towing vessel.

Figure 2:
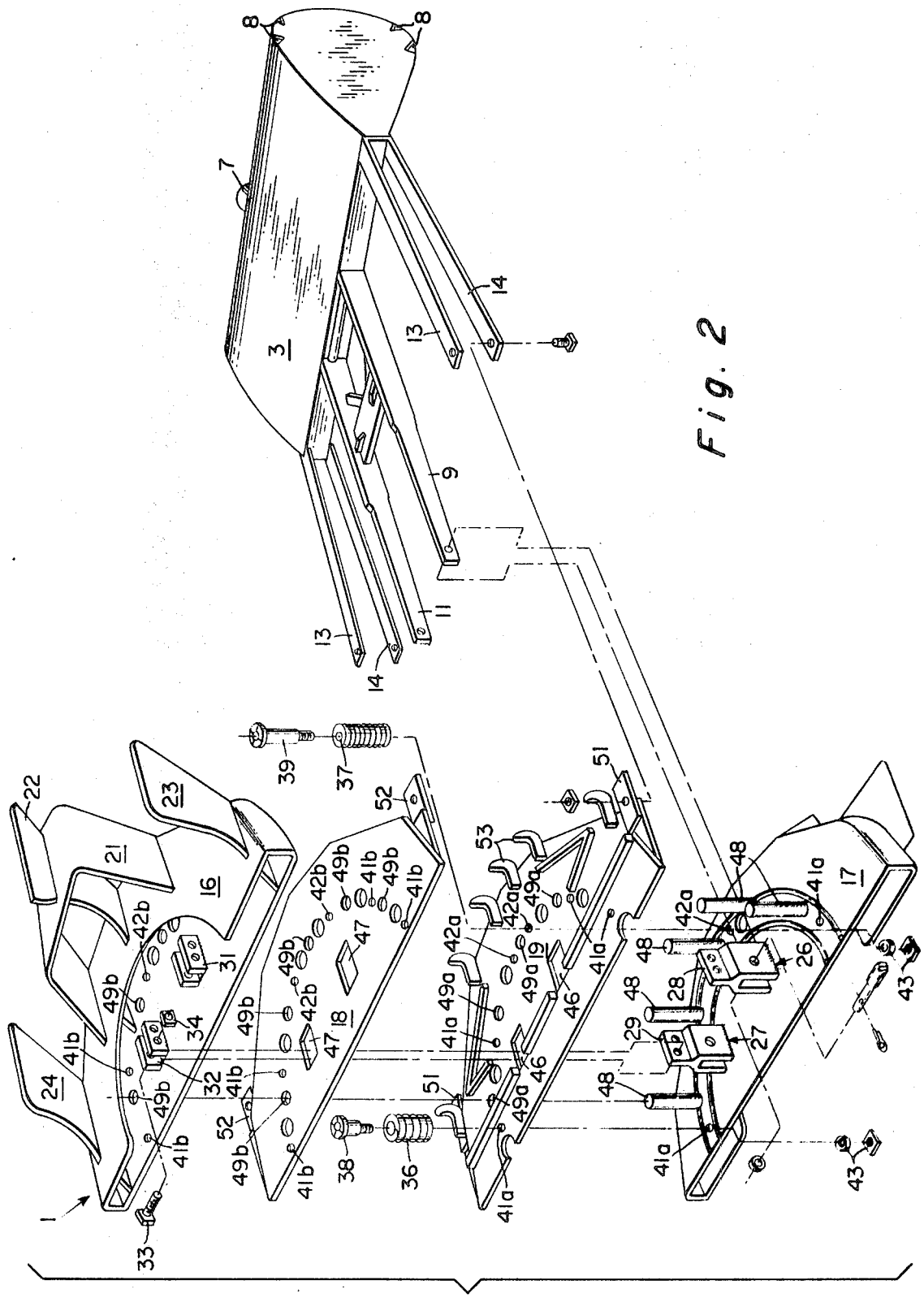
FIG. 2 is an exploded view showing the major parts of the apparatus and illustrating the manner in which these parts are assembled into a unitary structure.

The exploded view of FIG. 2 shows structural details of the various parts as well as the manner in which these parts are interconnected. Thus, as there seen sled 3 is shown as a free-flooding enclosure having symmetrical contours to permit it to operate either in the illustrated position or in an upside down position, this same symmetry also being applied to cable grabber 1. A towing eye 7 permits the coupling of cable 4 while upper and lower sets of holes 8 produce the desired free flooding. The sled is secured to cable grabber 1 by a pair of medially braced, rigid, towing beams 9 and 11 and also by two pairs of mounting braces disposed laterally outwardly of the towing beams, each of the pairs of mounting braces including upper and lower brace members 13 and 14.

Grabber 1 which, as stated, is towed along the sea floor by sled 3 preferably is formed as a four-layered sandwich including upper and lower plowhead members 16 and 17 and a pair of upper and lower pressure plates 18 and 19. These two members, as will be noted, generally are semicircular in form so as to provide an arcuately curved leading edge to improve the sledding action of he apparatus particularly on sea floors having substantial sediment deposits. Also, except for certain brackets and other interconnecting members, upper and lower plowheads 16 and 17 are symmetrical at least to the extent that the external contours are symmetrical to permit the grabber to operate rightside up or vice versa. Such symmetry is needed since deployment of the apparatus easily may produce one condition or the other. As to these external contours, it will be noted that upper plowhead 16 carries an outwardly projecting plowshare member 21 having a flange plate 22 which, when the grabber is riding upon this upper member, plows or digs into the sediment of the ocean floor to locate the cable of the oceanographic instrument being recovered. Further, the outer surface of the plowhead member 16 carries a pair of wing flanges 23 and 24 that also plow the ocean floor sediment and these wing flanges, as well as flange 22, all are provided with leading edges shaped to guide the located cable into a central spacing within the grabber where it can be clamped in a manner to be described. Lower plowhead 17 is identical with upper plowhead 16 to the extent that it also carries an identical plowshare 21 as well as wing flanges 23 and 24. Pressure plates 18 and 19 also are similarly contoured to the extent that each is formed of flat, substantially semicircular plate.

The assembly of cable grabber 1 is accomplished in the manner indicated in the exploded view of FIG. 2. In general, upper pressure plate 18 is bolted to upper plowhead 16 while lower plate 19 is bolted in a similar manner to lower plowhead 17. These two subassemblies then are secured together using a pair of lower brackets 26 and 27 each of which has an upwardly extending flange 28 and 29 adapted to be received between spaced brackets 31 and 32 carried by upper plowhead 16. Bolts 33 and nuts 34 secure the interconnection of the brackets. At this point it should be noted that the drawing has been simplified by showing only one of the bolts, it being apparent that four such bolts would be necessary. The same simplification of the drawing is applied to the showing of other bolts and springs used in the grabber.

One important feature is that a special spring arrangement which is employed to resiliently hold the two subassemblies in a spaced disposition which provides an opening or space 35 between the upper and lower pressure plates into which a section of the cable being retrieved can be guided by the plowshare, wings and other guides which also will be identified. The spring arrangement is one in which the resistance of the cable to the pull of towing sled 3 causes the pressure plates to contract and clamp the cable with a controlled force. More specifically, the preferred arrangement illustrated in FIG. 2 utilizes a set of eight die springs 36 and another set of four die springs 37, both of these sets being physically disposed in the space between pressures plates 18 and 19 to exert outward force on these plates. The springs are bolt mounted on the bolts used to couple the subassemblies, these bolts including a set of eight bolts 38 and another set of four bolts 39. Bolts 38 which mount springs 36 extend through aligned boltholes 41 formed in both plowheads as well as both pressure plates. Bolts 39 which mount springs 37 extend through bolt holes 42a and 42b also formed both in the plowheads and the pressure plates.

To assemble grabber 1, upper plowhead 16 first is sandwiched with upper pressure plate 18 and upper springs 36 and 37 then installed by mounting these springs on bolts 38 and 39 which then are inserted through openings 41b and 42b in such a manner that the upper springs exert pressure on upper plate 18 to hold this plate securely against upper plowhead 16. Nut and washer arrangements 43 secure the sandwich. In a similar manner, lower pressure plate 19 is sandwiched with lower plowhead 17 and, again, springs 36 and 37 mounted on their bolts 38 and 39 which, when inserted through openings 41a and 42a, secure the lower subassembly or sandwich. Openings 46 in lower pressure plate 19 permit brackets 26 and 27 to project upwardly through this plate. In addition, lower plowhead 17 mounts a plurality of alignment studs 48 which project through openings 49a formed in lower pressure plate 19.

With the springs so installed in each of the subassemblies, the two subassemblies are coupled together by bolting brackets 26 and 27 to brackets 31 and 32 of the upper plowhead. Upper pressure plate 18 is provided with openings 47 through which brackets 26 and 27 project. Also, upper pressure plate 18 as well as upper plowhead 16 each are formed with holes or openings 49b to receive alignment studs 48. Consequently, alignment studs 48 project transversely through space 35 formed between the two subassemblies so that the studs, in addition to their aligning function, also act as cable guide to restrain the cable that upon its receipt is guided into space 35. The radial or arcuate arrangement of alignment studs 48 is another feature of the invention since it causes the trapped cable section to be formed into a resiliently large radius or arc rather than being bent around any sharp corners such as would produce breakage particularly if the cable section were deteriorated by long usage.

When assembled, grabber 1 is coupled to towing sled 3 by bolting towing beams 9 and 11 of the sled to brackets 26 and 27 in a manner which is believed to be apparent in FIG. 2. Also, upper and lower pressure plates 18 and 19 each carry laterally spaced, relatively small flanges or plates 51 and 52 provided with openings by means of which these plates each are attached to one of the mounting braces 13 and 14 of sled 3. More specifically, lower mounting braces 14 of the sled are bolted to brackets 51 of plate 19, while upper mounting braces 13 are bolted to brackets 52 of the upper pressure plate. Consequently, any resistance to the pull of sled 3 is transferred through mounting braces 13 and 14 to pressure plates 18 and 19 to cause these plates to resiliently contract and clamp cable that has been guided into space 35 provided between these plates. It also can be noted at this point that the clamping force exerted by these plates on the cable thus becomes proportional to the degree of resistance to movement offered by the cable trapped between the plates. In other words, when the cable resistance is overcome there is no further tendency to contract plates 18 and 19 so that, in effect, the apparatus produces a controlled amount of clamping pressure to minimize cable breakage.

The manner in which the apparatus operates should be reasonably apparent from the foregoing description. After the grabber has been assembled and coupled to the towing sled, the sled is secured to towing cable 4 and the entire apparatus then deployed so as to come to rest on the ocean floor. Since the apparatus may rest on one or the other of its sides, the symmetry of the sled as well as the grabber becomes a significant feature. The apparatus then is towed along the ocean floor until the cable to be retrieved is contacted by plowshare 22 and wings 23 and 24, these members then guiding the cable into space 35 in which the trapped cable contacts alignment studs 48 so as to be formed into a relatively wide arc or radius. The guiding action of the apparatus is further improved by utilizing cable guide 53 provided at the leading arcuate edge of lower pressure plate 19. As shown, these cable guides are formed with upwardly extending hooks having arcuate leading edges and their use becomes particularly significant in which the apparatus may be partially submerged in sea floor sediment.

As the trapped cable wraps about alignment studs 48, it exerts a drag or resistance to the pull of towing sled 3 and, as has been stated, this resistance causes mounting braces 13 and 14, as well as plated 18 and 19, to contract. Contraction of these plates clamps the trapped cable to permit retrieval both of the cable and of the instrument to which it most likely is attached. The purpose in using separate sets of springs 36 and 37 is to control the manner in which the clamping plates exert their force against the trapped cable. In particular, springs 36 preferably are stouter or stronger than springs 37 so that the latter springs are the first to yield when the cable offers resistance to the pull. Since these latter springs 37 are mounted in the forward and central portion of the pressure plates, clamping pressure first is exerted by this forward, central portion. As the resistance to movement increases, springs 36 yield to increase the clamping force of the plate. However, as already stated, the clamping force is controlled to the extent that once the resistance to movement is overcome, no increased clamping force is exerted. This factor provides a distinct advantage particularly in comparison with some prior grabbers which exert and uncontrolled clamping force capable of producing cable breakage. Another advantage also pertinent to breakage is the previously mentioned fact that the trapped cable is wrapped around the relatively wide arc or radius provided by alignment studs 48. The wide radius avoids any sharp bending of the trapped cable which obviously promotes breakage. Other advantages reside in the stability of the apparatus which, in particular, is provided by the use of a free-flooding towing sled rigidly and strongly secured to grabber 1 so as to avoid any nose diving action of the grabber and also to move the grabber smoothly and evenly along the ocean floor. Further, the use of plowshares to locate the cable and to guide the cable into the clamping position permits this apparatus to be used on ocean floors having substantial sedimentary deposit.

Obviously many modifications and variations of the present invention are possible in the light of the above teachings. It is therefore to be understood that within the scope of the appended claims the invention may be practiced otherwise than as specifically described.

We claim:

1. Apparatus adapted to be towed along an ocean floor for retrieving cable lying on the floor, the apparatus comprising:
   a symmetrical sled adapted to be engaged by said tow,
   upper and lower mounting braces carried by the sled and extending rearwardly of its trailing end, and
   a cable grabber secured to the rearward ends of said mounting braces for being towably carried by the sled,
   said grabber including:
      symmetrical upper and lower platelike clamping members,
      means for resiliently holding said upper and lower members in a predetermined vertically spaced operative disposition,
      symmetrical plowlike flanges carried by said clamping members and projecting outwardly of each clamping member for plowing the surface of the ocean floor during the towing operation, said flanges being formed for guiding cable contacted during said plowing into the space between said clamping members, and
      cable-restraining means projecting into said space for restrainably engaging cable trapped in the space,
      said sled stabilizing said clamping members during towing and said upper and lower mounting braces of the sled being secured respectively to said upper and lower clamping members whereby the drag resistance of said trapped cable acting against the towing force of said sled causes said clamping members to resiliently contract for producing a cable clamping force commensurate with the drag resistance of the cable.

2. The apparatus of claim 1 wherein said restraining means is disposed for forming the trapped cable into a wide arc whereby bending deformation is minimized.

3. The apparatus of claim 1 wherein each of said upper and lower clamping members includes:
   a platelike plowhead member and a pressure plate member, the plowhead members carrying said plowlike flanges and also carrying means for rigidly securing one plow member to the other in said vertically spaced disposition,
   the apparatus further including:
      means for resiliently pressing each pressure plate member against its plowhead member, and
      alignment means carried by one of said plowhead members and extending through the other members,
      said upper and lower mounting braces being secured one to each of said pressure plate members for contractably clamping a trapped cable section.

4. The apparatus of claim 3 wherein said means for restraining a trapped cable section is provided by said alignment means and the alignment means are arranged in an arc providing a relatively large radius on which the trapped cable section is restrained whereby bending of the cable is minimized.

5. The apparatus of claim 3 wherein said upper and lower clamping members each are formed with an arcuate leading edge, the resilient means for said pressure plates being provided by a plurality of springs disposed in a spaced arcuate arrangement with the central forwardly disposed springs of the arc being weaker than the rearwardly disposed springs for producing a wedging pressure progressively increasing in a front to rear direction proportionally with the trapped cable resistance.

6. The apparatus of claim 5 wherein said means for rigidly securing said plowhead members is provided by a pair of laterally spaced centrally disposed brackets,
   said sled further including a pair of laterally spaced towing beams coupled one to each of said brackets.

7. The apparatus of claim 6 wherein at least a pair of upper and lower mounting braces is included,
   each of said pairs being disposed laterally outwardly of each of said towing beams in a position to equalize the pull of the sled on the grabber.